Nov. 13, 1962     F. H. INDERWIESEN     3,064,190

FREQUENCY SELECTIVE VOLTAGE INDICATOR

Filed Nov. 3, 1959

INVENTOR.
Frank H. Inderwiesen
BY Thos. E. Scofield
ATTORNEY.

United States Patent Office 3,064,190
Patented Nov. 13, 1962

3,064,190
FREQUENCY SELECTIVE VOLTAGE INDICATOR
Frank H. Inderwiesen, Prairie Village, Kans., assignor, by mesne assignments, to the United States of America as represented by the Office of Civil Defense
Filed Nov. 3, 1959, Ser. No. 850,556
6 Claims. (Cl. 324—80)

This invention relates generally to special electrical testing apparatus, and refers more particularly to a device of extreme simplicity for determining the presence and measuring the voltage of a single preselected frequency in a complex alternating current system.

One of the principal objects of the invention is to provide a testing instrument of the character described which can be advantageously employed in testing at various locations in an alternating current network for the presence of a special signal frequency of sufficient voltage to accomplish the purpose for which the signal is introduced to the network. An example of a particular application for my invention is in connection with a power network in which the lines of the network are employed for transmission of the signal along with the usual power frequency and voltage. My device can be used either to check the effectiveness of the network for transmitting the signal to various points therein, or to monitor specific locations to determine whether the signal is of sufficient strength as to operate signal responsive equipment installed at such locations.

A related object of the invention is to provide an instrument for the purposes set forth which is extremely simple, yet capable of discriminating accurately between the frequencies present in the network or system to select and measure the voltage of the signal frequency only.

A further object of the invention is to provide a testing instrument of the character described which is capable of determining within certain limits whether the measured signal frequency is that for which the instrument is designed, and if there is any variation, whether the actual signal frequency being received at the instrument is greater or less than the design frequency.

Still another object of the invention is to provide a testing instrument of the character described which provides for immediate optical determination of the signal voltage and which can be easily handled by persons of ordinary intelligence without any technical background required.

Other and further objects of the invention, together with the features of novelty appurtenant thereto will appear in the course of the following description.

In the accompanying drawings which form a part of the specification and are to be read in conjunction therewith, and in which like reference numerals indicate like parts in the various views.

Figure 4:
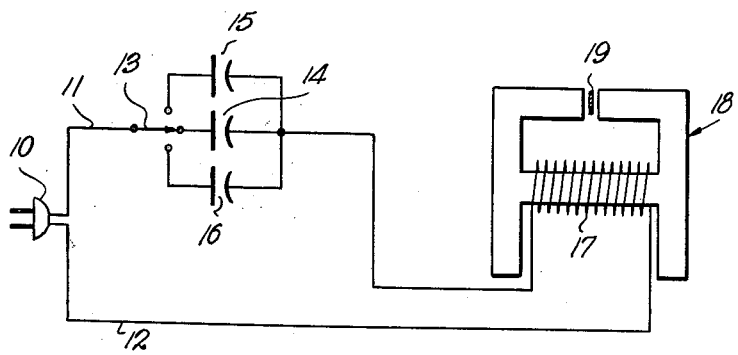
FIG. 4 is a diagramatic showing of the electrical circuitry of the instrument.

Referring now to the drawings, and initially to FIG. 4, in the preferred form the device is designed for connection with a conventional wall outlet (not shown) of a power network, and to this end there is provided the usual two-sprong plug 10. Connected with plug 10 are the conductors 11 and 12. A selector switch 13 is interposed between the plug 10 and three capacitors 14, 15 and 16, and is operable to selectively close a circuit through any one of the capacitors and an inductor coil 17 which is wound on the transverse bar of a generally A-shaped laminated core 18. The upper bar of the core is provided with an air gap in which is positioned a vibratable reed 19 of magnetic material, more of which will be said later.

The tuned circuit which includes the capacitor 14 is tuned as closely as possible to the particular frequency to be measured. In one application for the invention which I presently have in mind, the signal frequency is the fourth harmonic of the fundamental 60 cycle power frequency, that is, 240 c.p.s., and ranges from 0 to 3 volts. It will be understood, however, that by simple substitution and proper design, the tuned electrical circuit can be adjusted to selection and reception of other frequencies, although, because of the limitations of the mechanical aspects of the instrument, I do not contemplate going beyond the lower (audio) frequencies.

Figure 1:
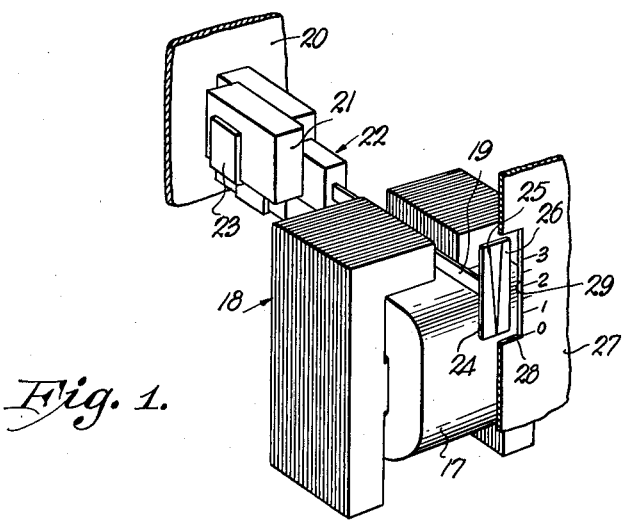
FIG. 1 is a fragmentary perspective, somewhat schematic, showing certain elements of the device, parts being broken away for purposes of illustration.

The reed 19 and its associated components are best seen in FIG. 1 which illustrate in schematic form the core 18, winding 17, and the support for the reed. The reed is anchored at one end to a support 20 which may be the back or side wall of a suitable casing (not shown). It will be understood, of course, that the core 18 will be fixed relative to the reed. The reed is constructed of good quality magnetic material, for example, steel. It is polarized by means of a ceramic or other type permanent magnet 21 which lies adjacent and is held in contact with the reed anchoring structure 22 by means of a bracket 23. It will be understood that the anchor structure 22 is likewise of magnetic material so as to provide a path to the reed for the flux of the permanent magnet 21.

The reed is constructed to be mechanically resonant at the design signal frequency, which in the example here under consideration would be 240 c.p.s. It will therefore be evident that if the alternating current magnetic field set up in the core by the tuned circuit is at the signal frequency, the mechanically resonant reed will vibrate at maximum amplitude. However, as is known, the maximum amplitude is affected by the voltage of the signal, increasing as the voltage increases, and decreasing as it decreases.

To provide a means for optically determining the amplitude of vibration of the reed at any given time, there is provided on the free end of the reed a thin, flat indicator member 24 which is preferably in the form of a rectangular sheet disposed in a plane normal to the longitudinal axis of the reed. The member 24 may be of any suitable paper-thin metallic sheet which can be soldered or otherwise connected firmly with the reed. The design of the reed for resonance at the design signal frequency will, of course, take into account the mass of the member 24.

It will be noted that inscribed upon the outer face of member 24 are a pair of converging lines 25 and 26 which are symmetrical with respect to a plane which is itself normal to the direction of vibration of the reed. As will later be more apparent, the angle of divergence of lines 25 and 26 will depend primarily on the range of voltage variation expected, and the amplitude of vibration of the reed end at the upper limit of voltage.

Positioned adjacent the member 24, but permitting free vibration thereof, is a stationary member 27 which may conveniently be a part of the housing for the instrument, also. A window 28 is provided therein, having one edge 29 transverse to the direction of vibration of member 24. Calibrations are provided on the member 27 adjacent edge 29, the calibrations forming a scale running lengthwise of the lines 25 and 26. More will be said later concerning calibration of the scale.

With the foregoing general description in mind, the nature of the instrument can now perhaps be better understood by considering the phenomena resulting from the reception at the unit of the signal of the selected frequency. Immediately this occurs, the alternating current magnetic field set up in the inductor causes the reed to vibrate, the amplitude depending upon the strength of the signal.

Figure 2:
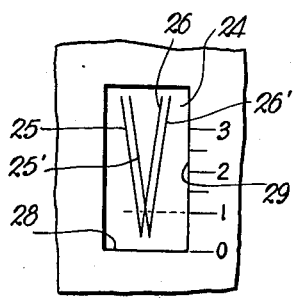
FIG. 2 is an end-on view of the voltage indicating member and adjacent scale under one condition of operation.
Figure 3:
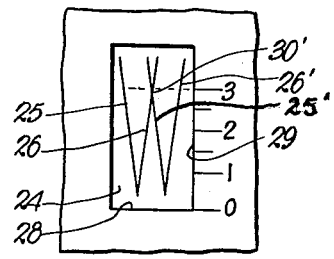
FIG. 3 is a view similar to FIG. 2, but showing the same elements under another condition of operation.

The results which will be apparent to an observer are reflected in FIGS. 2 and 3, which show the member 24 as it would appear looking directly toward the free end of the reed and in line therewith under two differing voltages. Under vibration, the lines 25 and 26 are visible only at the maximum excursion of the reed, with the optical result that the observer sees, in effect, two sets of lines 25 and 26, and 25' and 26', which appear to overlap to provide an intersection point 30. In FIG. 2, the amplitude of vibration is relatively small, so the apparent intersection occurs near the lower end of the lines. FIG. 3 illustrates a condition of greater amplitude of vibration wherein the apparent intersection occurs at a point 30' where there is a greater separation between lines 25 and 26. In general, it may be said that the greater the voltage of the signal, the further upward will be the apparent intersection point 30.

The calibration of the scale against which the intersection point is measured can be accomplished simply by connecting the instrument with a signal generator in which known voltages can be applied. The principles of such a generator are taught in the Arthur Laudel, Jr. Patent No. 2,906,897, issued September 29, 1959. For example, a voltage of a given value is applied and a line is inscribed on member 25 on the level of the apparent intersection point observed. The applied voltage is marked adjacent this line. The voltage is then adjusted to a new value (say up or down 0.5 volt) and another line is inscribed reflecting the shift in the apparent intersection point. This procedure is followed through the full voltage range for which the instrument is designed.

The operation of the unit in field testing should be evident from the foregoing description. The unit is plugged into the wall outlet or otherwise connected with the conductors of the network and the indicator member 24 is visually observed through the window. If the signal is present, the indicator will be under vibration and the overlapping pairs of lines will appear. The point of intersection of the lines is visually compared against the calibrated scale which indicates the voltage at which the signal is being received.

Under some conditions of field operation it may be desirable to determine whether the frequency being received at the instrument is exactly the design frequency, and consequently I have provided a means of accomplishing this.

Returning again to FIG. 4, it will be noted that the capacitors 15 and 16 are capable of being selectively introduced into the circuit through the medium of switch 13. These capacitors are given, respectively, a capacitance above and below that of the mean tuning capacitance 14. Preferably the differential will be in the nature of 20% to 40% greater or less, which makes it possible to determine frequency variations in the range of plus or minus 10% from the design frequency.

Assuming that the signal is at exactly the design frequency, for example, 240 c.p.s., the effect of switching to either of the capacitors 15 or 16 will be to reduce the amplitude of vibration of the reed because of the screening in the alternate tuned circuits of the 240 c.p.s. signal. The decrease in voltage will be reflected in a lesser amplitude of vibration of the reed and its indicating member. Therefore, if it should occur that upon switching to the capacitors 15 and 16 there is in both instances a decrease in the voltage reading, this indicates that the signal frequency is at the design value.

Let us consider, however, the effects obtained in the event that the actual signal is somewhat higher than the design frequency, for example, 250 c.p.s. Here the observed result will be that upon shifting to the lower capacitance 15, the amplitude of vibration will increase over that observed when the circuit is in its normal condition. The reason for this is that if the actual signal is 250 c.p.s., it will be present at a greater voltage as the tuning of the circuit is changed to more closely approach it. The increased voltage thus results in a greater amplitude of vibration for the reed. Conversely, the amplitude of vibration of the reed will decrease upon switching to capacitor 16, since there is even greater screening of the 250 c.p.s. signal at the higher capacitance. Consequently, if it occurs that upon switching to the lower capacitance 15 the observed voltage increases, then it can be concluded that the frequency being received is somewhat higher than that of the design frequency.

The results obtained with a signal which is below the design frequency, say, for example, 230 c.p.s., are exactly the opposite from those set forth above. In this case, switching to the higher capacitance 16 will produce a greater amplitude of vibration of the reed, and to the lower capacitance 15, a decrease. Thus, if it occurs that upon switching to the higher capacitance the voltage increases, then this is an indication that the frequency being received is somewhat lower than the design frequency.

It will be understood, of course, that the instrument is not used to determine the actual frequency present in case of variation from the design frequency. However, it can and does indicate that the variation is present and in which direction the differential lies.

It will also be understood that in place of selective switching to different individual capacitors, a variable capacitor may be employed.

From the foregoing it will be seen that this invention is one well adapted to attain all of the ends and objects hereinabove set forth together with other advantages which are obvious and which are inherent to the structure.

It will be understood than certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A frequency selective voltage indicator for optically determining the voltage of a single frequency in the audio range in a complex alternating current system, comprising a series tuned circuit tunde to the frequency to be measured, and including a capacitor and an inductor, said circuit connected with said system, a vibratable reed of magnetic material anchored at one end and free at the other and magnetically coupled with said inductor, and indicating member secured to said other end of said reed and having a surface transverse to the long axis of the reed, said surface bearing thereon a pair of visible converging lines symmetrical with respect to a plane normal to the direction of vibration of the reed, a second surface which is stationary relative to the reed and disposed parallel with the surface of said indicating member and in close proximity thereto without, however, concealing said lines, a linear scale carried by said second surface, the divisions of said scale being spaced from one another in a direction normal to the direction of vibration of the reed.

2. A frequency selective voltage indicator as in claim 1 wherein said indicator includes a magnetic core having confronting spaced poles, said reed extending between said poles.

3. A frequency selective voltage indicator as in claim 2, including means for permanently polarizing said reed.

4. A frequency selective voltage indicator for optically determining the voltage of a single frequency in the audio range in a complex alternating current system comprising a series tuned circuit tuned to the frequency to be measured, and including a capacitor and an inductor, said circuit connected with said system, a vibratable reed of magnetic material anchored at one end and free at the other and magnetically coupled with said inductor, an indicating member secured to said other end of said reed and having a surface transverse to the long axis of the reed, said surface bearing thereon a pair of visible converging lines symmetrical with respect to a plane normal to the direction of vibration of the reed, a second surface which is stationary relative to said reed and disposed parallel with and superposed over the surface of the indicator member and spaced therefrom to permit free vibration of the latter, said second surface provided with an opening exposing said lines, and a linear scale on said second surface adjacent said opening, said scale extending in a direction normal to the direction of vibration of said reed.

5. A frequency selective voltage indicator for optically determining the voltage of a single frequency in the audio range in a complex alternating current system, comprising a series tuned circuit tuned to the frequency to be measured, and including a capacitor and an inductor, said circuit connected with said system, a vibratable reed anchored at one end and free at the other and magnetically coupled with said inductor, an indicating member secured to said other end of said reed and having a surface transverse to the long axis of the reed, said surface bearing thereon a pair of visible converging lines symmetrical with respect to a plane normal to the direction of vibration of the reed, and stationary scale means cooperating with said indicator member, said scale means calibrated to afford a means of measuring the amplitude of vibration of the reed as reflected by the optically visible intersection of said lines occurring during vibration of the reed.

6. A frequency selective voltage indicator as in claim 5, including means for selectively tuning said tuned circuit to frequencies above and below said single frequency.

References Cited in the file of this patent

UNITED STATES PATENTS

| | | |
|---|---|---|
| 1,971,899 | Buttolph | Aug. 28, 1934 |
| 2,097,313 | Venzke | Oct. 26, 1937 |
| 2,219,803 | Bourne | Oct. 29, 1940 |
| 2,270,294 | Hall | Jan. 20, 1942 |
| 2,392,981 | Fischler | Jan. 15, 1946 |
| 2,648,822 | Walter | Aug. 11, 1953 |
| 2,803,800 | Vilbig | Aug. 20, 1957 |
| 2,845,607 | Bowler et al. | July 29, 1958 |